United States Patent [19]

Sanko et al.

[11] Patent Number: 5,524,383
[45] Date of Patent: Jun. 11, 1996

[54] DISASSEMBLEABLE PORTABLE COLD FRAME APPARATUS

[76] Inventors: Paul J. Sanko, R.D. 3, Box 315, Tunkhannock, Pa. 18657; James M. Sanko, R.D. 2 Box 135, Olyphant, Pa. 18447

[21] Appl. No.: 406,467

[22] Filed: Mar. 20, 1995

[51] Int. Cl.⁶ .................................... A01G 9/00
[52] U.S. Cl. ................ 47/60; 47/19; 220/4.33; 217/43 A
[58] Field of Search ................. 47/19, 60 NL, 47/60 W; 220/4.28, 4.33; 217/43 A

[56] References Cited

U.S. PATENT DOCUMENTS

| | | | |
|---|---|---|---|
| 1,954,674 | 4/1934 | Lager | 47/60 NL |
| 2,963,819 | 12/1960 | Hoch | 47/60 NL |
| 3,106,807 | 10/1963 | Risacher | 47/60 EC |
| 3,315,800 | 4/1967 | Wagner | 217/43 A |
| 4,148,154 | 4/1979 | King | 47/60 NL |

FOREIGN PATENT DOCUMENTS

| | | | |
|---|---|---|---|
| 1388538 | 12/1964 | France | 47/19 |
| 2226924 | 11/1974 | France | 47/60 NL |
| 649680 | 6/1985 | Switzerland | 47/60 NL |
| 355347 | 8/1931 | United Kingdom | 47/19 |
| 638429 | 6/1950 | United Kingdom | 47/19 |

Primary Examiner—Henry E. Raduazo

[57] ABSTRACT

A disassembleable portable cold frame apparatus including a rigid tray having a recessed area formed thereon; a plurality of planar rigid side plates removably interconnected together in an end-to-end configuration to thereby create a border bounding a ground holding space and with the border positioned within the recessed area of the tray; and a rigid transparent cover enclosing an air space and with the cover disposed upon and removably hingably coupled to the border to place the air space in communication with the ground holding space.

2 Claims, 5 Drawing Sheets

DISASSEMBLEABLE PORTABLE COLD FRAME APPARATUS

BACKGROUND OF THE INVENTION

1. Field of the Invention

The present invention relates to a disassembleable portable cold frame apparatus and more particularly pertains to allowing proper maintenance of light, temperature, and humidity within an enclosed space for ready growth of plants with a disassembleable portable cold frame apparatus.

2. Description of the Prior Art

The use of cold frames is known in the prior art. More specifically, cold frames heretofore devised and utilized for the purpose of providing an enclosed environment suitable for growth of plants are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,206,892 to Telkes et al. discloses a collapsible cold frame. U.S. Pat. No. 4,301,618 to August discloses a growing frame. U.S. Pat. No. 4,651,466 to Robinson discloses a garden bed frame. U.S. Pat. No. 4,751,792 to Robinson discloses brackets for a frame for a garden bed.

While these devices fulfill their respective, particular objective and requirements, the aforementioned patents do not describe a disassembleable portable cold frame apparatus that provides a readily assembleable, disassembleable, and transportable structure for allowing the ready growth of plants therein.

In this respect, the disassembleable portable cold frame apparatus according to the present invention substantially departs from the conventional concepts and designs of the prior art, and in doing so provides an apparatus primarily developed for the purpose of allowing proper maintenance of light, temperature, and humidity within an enclosed space for ready growth of plants.

Therefore, it can be appreciated that there exists a continuing need for new and improved disassembleable portable cold frame apparatus which can be used for allowing proper maintenance of light, temperature, and humidity within an enclosed space for ready growth of plants. In this regard, the present invention substantially fulfills this need.

SUMMARY OF THE INVENTION

In the view of the foregoing disadvantages inherent in the known types of cold frames now present in the prior art, the present invention provides an improved disassembleable portable cold frame apparatus. As such, the general purpose of the present invention, which will be described subsequently in greater detail, is to provide a new and improved disassembleable portable cold frame apparatus and method which has all the advantages of the prior art and none of the disadvantages.

To attain this, the present invention essentially comprises, in combination, a rigid plastic rectangular tray having a planar bottom with an upper integral rectangular ledge extended therearound to define a central recessed area. The ledge is formed of a pair of spaced parallel long rails and a pair of spaced parallel short rails extended therebetween. The ledge further has four elongated tabs extended perpendicularly upwards therefrom at a corner thereof and with each tab additionally having a through hole formed thereon.

A pair of planar rigid plastic rectangular short side plates is included. Each short side plate has a periphery formed of an upper long edge, a lower long edge, and a pair of short side edges extended therebetween and with each side edge further having a rectangular tongue projected outwardly therefrom. Each tongue additionally has a through hole formed centrally thereon. Each short side plate additionally includes a pair of spaced through holes formed thereon at a location near the upper edge thereof A pair of planar rigid plastic rectangular long side plates is also included. Each long side plate has a periphery formed of an upper long edge, a lower long edge, and a pair of short side edges extended therebetween. Each long side plate further has a pair of rectangular slots formed therethrough with each slot located adjacent to one of the side edges thereof. Each side edge of the long side plate additionally has a through hole disposed thereon in communication with the adjacently located slot. The short side plates are perpendicularly extended between the long side plates and with each tongue thereof slidably disposed within an adjacent slot of a long side plate to thereby create a rectangular border bounding a ground holding space. The border is positioned upon the central recess of the tray in contact with the rails thereof.

A first set of four rigid plastic pegs is included. Each peg is separately disposed within one of the through holes of one of the tabs, within one of the through holes of one of the long side plates of the border, and within the through hole on the tongue of the associated short side plate of the border. The pegs thus place the border in a secure interconnected configuration.

A rigid transparent plastic cover is provided. The cover includes a short rectangular front wall having a periphery formed an upper edge, a lower edge, and a pair of opposed side edges, a tall rectangular back wall having a periphery formed of an upper edge, a lower edge, and a pair of opposed side edges, a pair of opposed spaced side walls extended perpendicularly between the front wall and back wall to create a perimeter bounding an air space. Each side wall has a periphery formed of a bottom edge extended perpendicularly between the front wall and back wall, a top edge extended angularly upwards from the front wall to the back wall, a short front edge coupled to a side edge of the front wall, and a long back edge coupled to a separate side edge of the back wall. The cover additionally includes a rectangular lid positionable upon the perimeter and over the air space and a hinge coupling the lid to the back wall. Each side wall additionally includes a pair of spaced brackets coupled thereto and extended downwards therefrom. Each bracket has a through hole formed thereon.

Lastly, a second set of four rigid plastic pegs is proved. Each peg is removably disposed within a through hole of one of the brackets of the cover and within a through hole on the side wall of the border near the upper edge thereof. The second set of pins thereby secures the cover in an aligned position upon the border to thereby place the air space directly above the ground holding space. Two symmetrically opposed pins of the second set are removable for allowing the cover to be pivotally opened and closed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is the based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disassembleable portable cold frame apparatus which has all the advantages of the prior art cold frames and none of the disadvantages.

It is another object of the present invention to provide a new and improved disassembleable portable cold frame apparatus which may be easily and efficiently manufactured and marketed.

It is a further object of the present invention to provide a new and improved disassembleable portable cold frame apparatus which is of durable and reliable construction.

An even further object of the present invention is to provide a new and improved disassembleable portable cold frame apparatus which is susceptible of a low cost of manufacture with regard to both materials and labor, and which accordingly is then susceptible of low prices of sale to the consuming public, thereby making such a disassembleable portable cold frame apparatus economically available to the buying public.

Still yet another object of the present invention is to provide a new and improved disassembleable portable cold frame apparatus which provides in the apparatuses and methods of the prior art some of the advantages thereof, while simultaneously overcoming some of the disadvantages normally associated therewith.

Even still another object of the present invention is to provide a new and improved disassembleable portable cold frame apparatus for allowing proper maintenance of light, temperature, and humidity within an enclosed space for ready growth of plants.

Lastly, it is an object of the present invention to provide a new and improved disassembleable portable cold frame apparatus comprising a rigid tray having a recessed area formed thereon; a plurality of planar rigid side plates removably interconnected together in an end-to-end configuration to thereby create a border bounding a ground holding space and with the border positioned within the recessed area of the tray; and a rigid transparent cover enclosing an air space and with the cover disposed upon and removably hingably coupled to the border to place the air space in communication with the ground holding space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein.

The same reference numerals refer to the same parts through the various Figures.

DESCRIPTION OF THE PREFERRED EMBODIMENT

Figure 1:
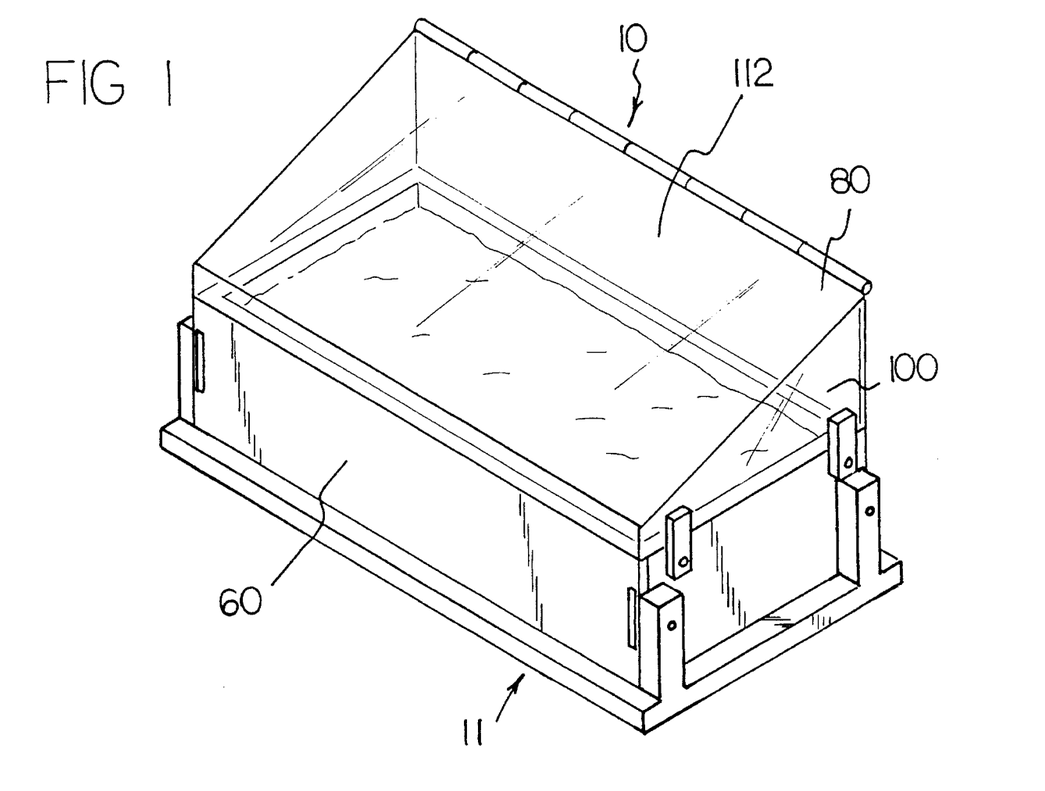
FIG. 1 is a perspective view of the preferred embodiment of the disassembleable portable cold frame apparatus constructed in accordance with the principles of the present invention.

With reference now to the drawings, and in particular, to FIG. 1 thereof, the preferred embodiment of the new and improved disassembleable portable cold frame apparatus embodying the principles and concepts of the present invention and generally designated by the reference number 10 will be described.

The preferred embodiment of the present invention comprises a plurality of components. In their broadest context, such components include a tray, a border, and a cover. Such components are individually configured and correlated with respect to each other to provide the intended function of allowing proper maintenance of light, temperature, and humidity within an enclosed space for the ready growth of plants.

Figure 7:
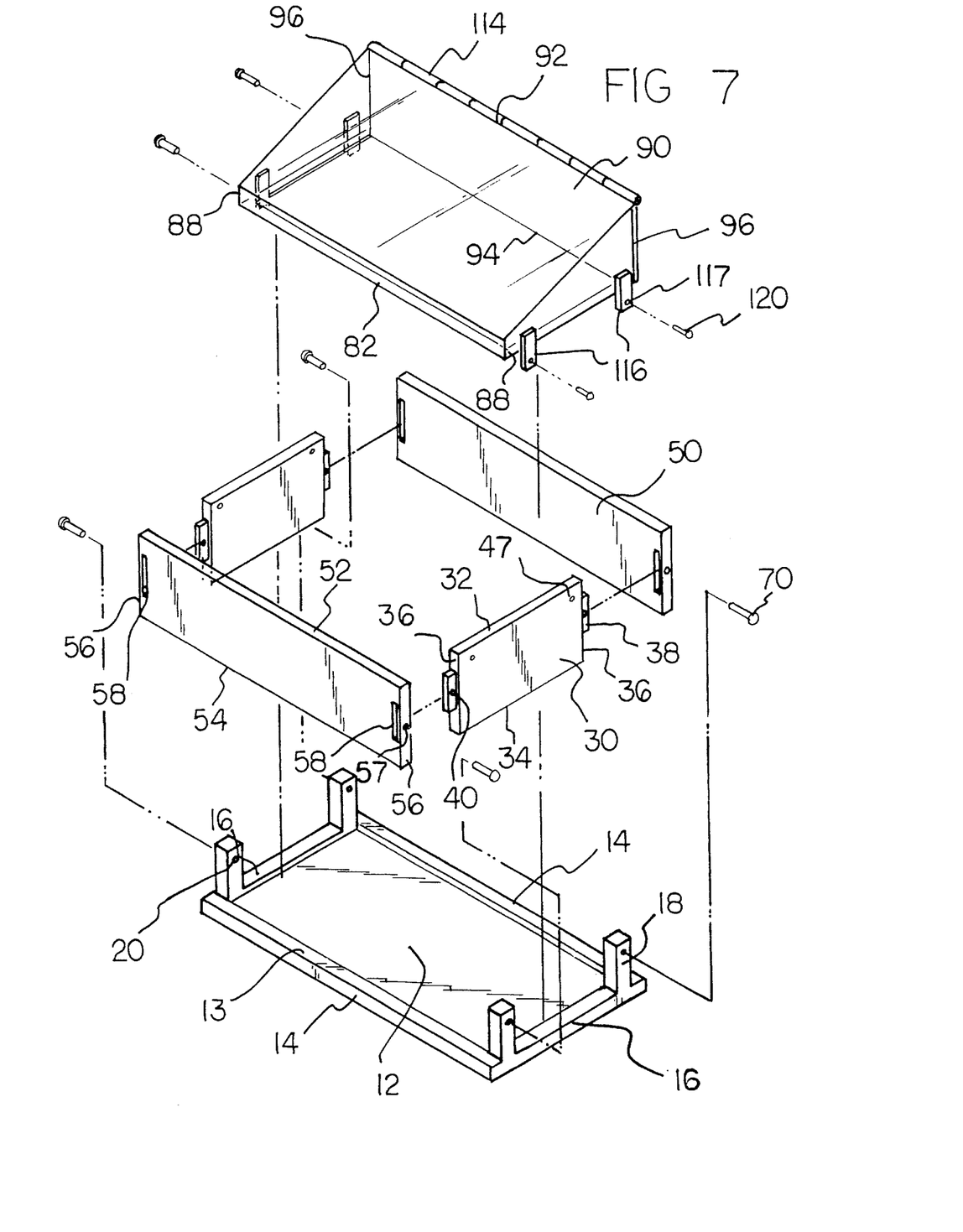
FIG. 7 is an exploded perspective view of the preferred embodiment of the present invention.

Specifically, the present invention includes a tray 11. As best illustrated in FIG. 7, the tray has a planar bottom 12 with an upper integral rectangular ledge 13 therearound to define a central rectangular recessed area. The ledge is formed of a pair of spaced parallel long rails 14 and a pair of spaced parallel short rails 16 extended therebetween. The ledge also has four elongated tabs extended perpendicularly upwards therefrom at a corner thereon. Each tab 18 has a circular through hole 20 formed thereon. The tray is positionable upon a recipient supporting surface such as bare ground or a cement patio.

Also included is a pair of short side plates 30. Each side plate is rectangular and planar in structure. Each short side plate has a periphery formed of an upper long edge 32, a lower long edge 34, and a pair of short side edges 36 extended between the upper long edge and lower long edge. Each side edge of each side plate further has a rectangular tongue 38 projected outwardly therefrom as best illustrated in FIG. 7. Each tongue includes a circular through hole 40 formed centrally thereon. In addition, each short side plate includes a pair of spaced circular through holes 42 formed thereon at a location near the upper edge thereof.

Also provided is a pair of long side plates 50 as shown in FIG. 7. Each long side plate is planar and rectangular in structure. Each long side plate has a periphery formed of an upper long edge 52, a lower long edge 54, and a pair of short side edges 56 extended therebetween. Each long side plate also includes a pair of rectangular slots 58 formed thereon. Each slot is located adjacent to and parallel with a separate side edge 56. Each side edge of the long side plate additionally has a central circular through hole 57 disposed thereon in communication with the adjacently located slot 58.

Figure 3:
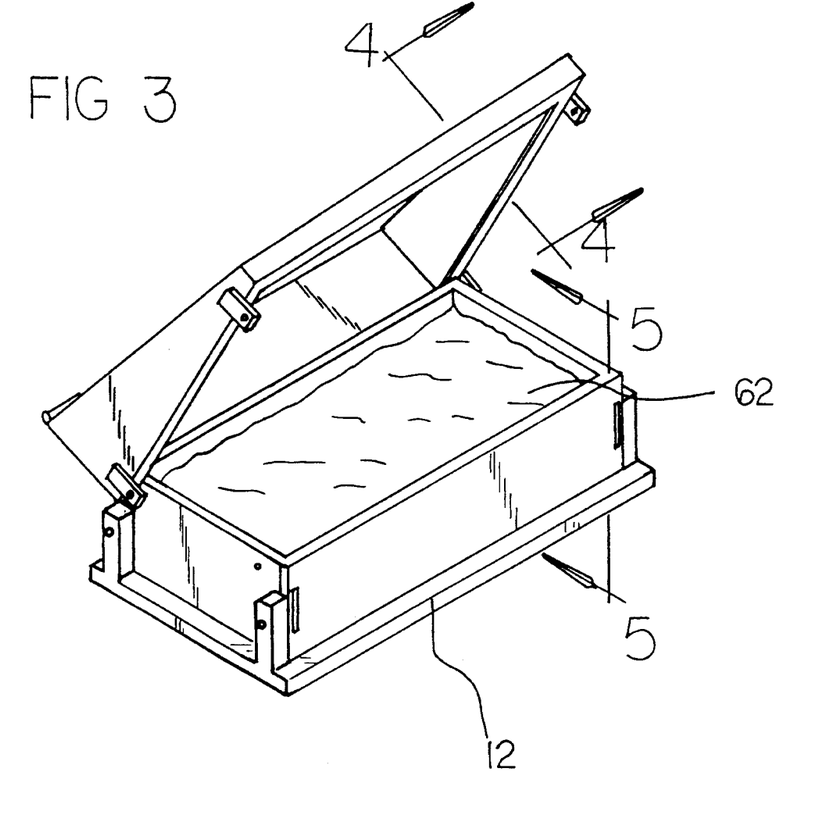
FIG. 3 is a perspective view of the present invention with its cover open.
Figure 4:
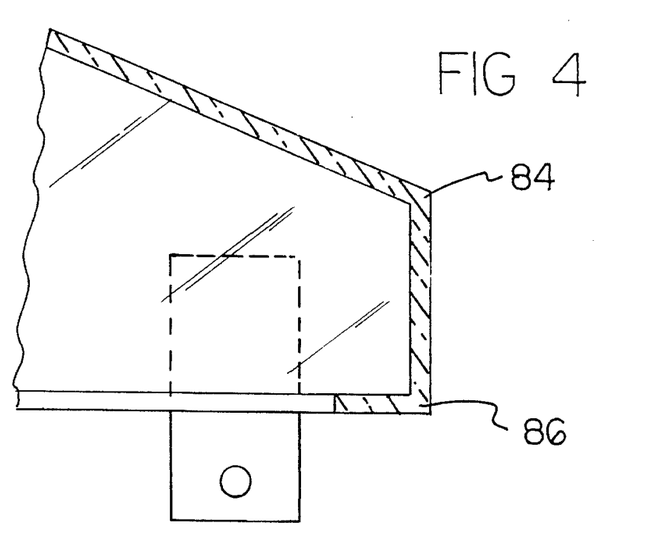
FIG. 4 is a cross-sectional view of the cover of the present invention taken along the line 4—4 of FIG. 3.
Figure 5:
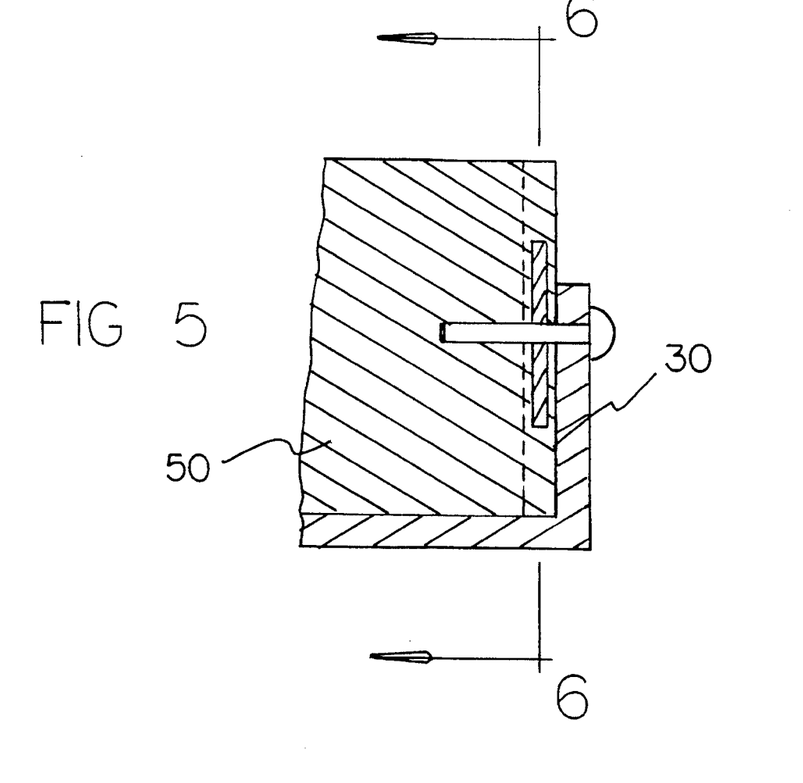
FIG. 5 is a cross-sectional view of the present invention taken along the line 5—5 of FIG. 3.
Figure 6:
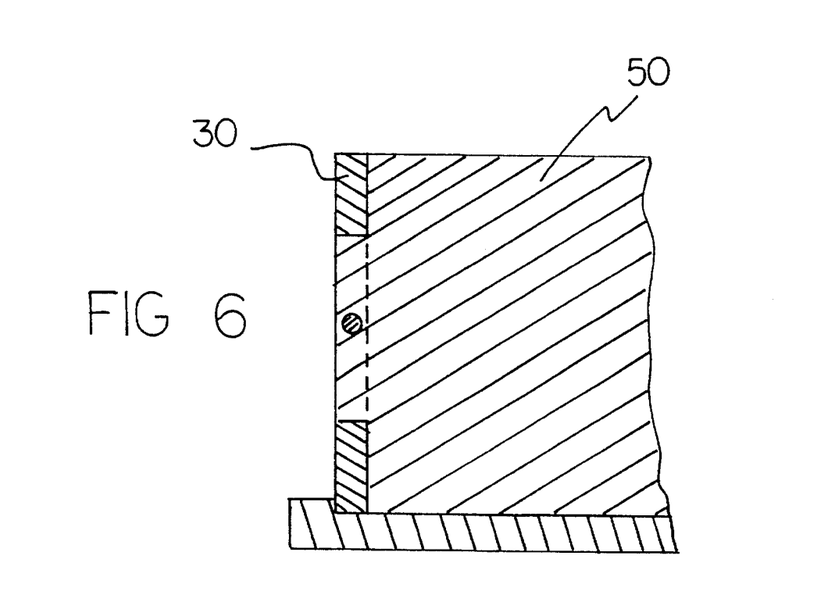
FIG. 6 is a cross-sectional view of the present invention taken along the line 6—6 of FIG. 5.

The short side plates are perpendicularly extended between the long side plates in an operable configuration. When placed in this configuration, each tongue 38 of a short side plate is slidably disposed within an adjacent slot 58 of a long side plate to thereby create a rectangular border 60. In addition, the through holes 57 of the associated long walls are axially aligned with the through holes 40 on the tongues of the associated short walls. The border 60 bounds a ground holding space 62 as best illustrated in 64. The border is aligned within the central recess of the tray and placed in contact with the rails thereof as shown in FIG. 3. The ledge of the tray helps to hold the plates in their respective positions. The border may now be filled with earth for planting. In this position, the tray thereby prevents inadvertent repositioning of the border and also helps the border hold earth and retain its shape when filled with earth.

The present invention also includes a first set of rigid plastic pegs 70. Each peg is separately disposed within one of the through holes 20 of one of the tabs 18, within one of the through holes 57 of one of the long side plates 50 of the border, and within the associated through hole 40 on the tongue 38 of an associated short side plate 30 as shown in FIG. 7. When coupled with the pegs, the side plates of the border are placed in a secured interconnected configuration. In the preferred embodiment, the tray, plates, and pegs are formed of a rigid impact-resistant lightweight plastic material.

Figure 2:
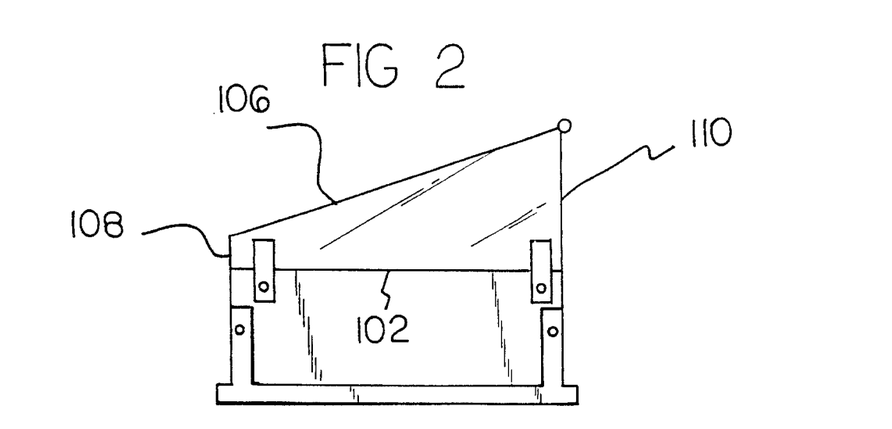
FIG. 2 is a side-elevational view of the preferred embodiment of the present invention.

Also provided is a cover 80. The cover is formed of a rigid transparent impact-resistant lightweight plastic material such as plexiglass. As best illustrated in FIG. 7, the cover includes a short rectangular planar front wall 82 having a periphery formed of an upper edge 84, a lower edge 86 and a pair of opposed side edges 88. Also included is a tall rectangular planar back wall 90. The back wall has a periphery formed of an upper edge 92, a lower edge 94, and a pair of opposed side edges 96. A pair of opposed spaced side walls 100 are extended perpendicularly between the front wall and back wall to create a perimeter bounding an air space. Each side wall has a periphery formed of a bottom edge 102 extended perpendicularly between the front wall and back wall, a top edge 106 extended angularly upwards from the front wall to the back wall, a straight vertical short front edge 108 coupled to a side edge of the front wall, and a straight vertical long back edge 110 coupled to a separate side edge of the back wall. The cover additionally includes a rectangular lid 112 positionable upon the perimeter and over the air space. Also provided is a hinge 114 that couples the lid to the back wall. Each side wall of the cover additionally includes a pair of spaced brackets 116 coupled thereto as shown in FIG. 2. The brackets are extended downwards from the cover. Each bracket has a through hole 117 formed thereon.

Lastly, a second set of pegs 120 are provided. Each peg of the second set is formed of the same material as that of the first set of pegs. Each peg of the second set is removably disposed within one of the through holes 117 of one of the brackets 116 of the cover and within a through hole 47 on the side wall 30 of the border. The second set of pins thus secures the cover 80 in an aligned and generally sealed position upon the border 60 and thereby places the air space directly above and in communication with the ground holding space. Two symmetrically opposed pins of the second set are removable for allowing the cover to be pivotally opened and closed as shown in FIG. 3.

The present invention is a portable gardening bed with a transparent cover that offers a convenient place for growing a variety of plants. In essence, it is a mini-green house. The present invention is made entirely from plastic. The present invention comes in the form of component parts that can be easily assembled or disassembled.

The present invention includes a bottom tray whose central recess measures about 4 feet 4 inches long by about 2 feet wide. Another component is a border formed with four side plates—two long side plates and short side plates. The long side plates are 4 feet 4 inches long by about 12 inches wide, and the short side plates are about 2 feet 4 inches long and by about 12 inches wide. The long side plates are slotted on their side edges and the short side plates are tongued on both side edges so that they fit together snugly. Each long side plate has a pair of ½ inch diameter through holes formed thereon. The cover has brackets with ½ inch diameter through holes on their ends. The brackets are interlocked with the border with four pegs. The cover is angled for better drainage and has a hinge at the higher end. The lower edge of the cover also has a lip around its inside perimeter so that it fits more securely on the border.

To use the present invention, assemble the pieces and position on the ground, fill the ground holding space of the border with earth, and plant seeds. The present invention can be used on patios, rooftops in the cities, yards, and other similar locations. The present invention has advantages of being readily portable and lightweight.

Figure 8:
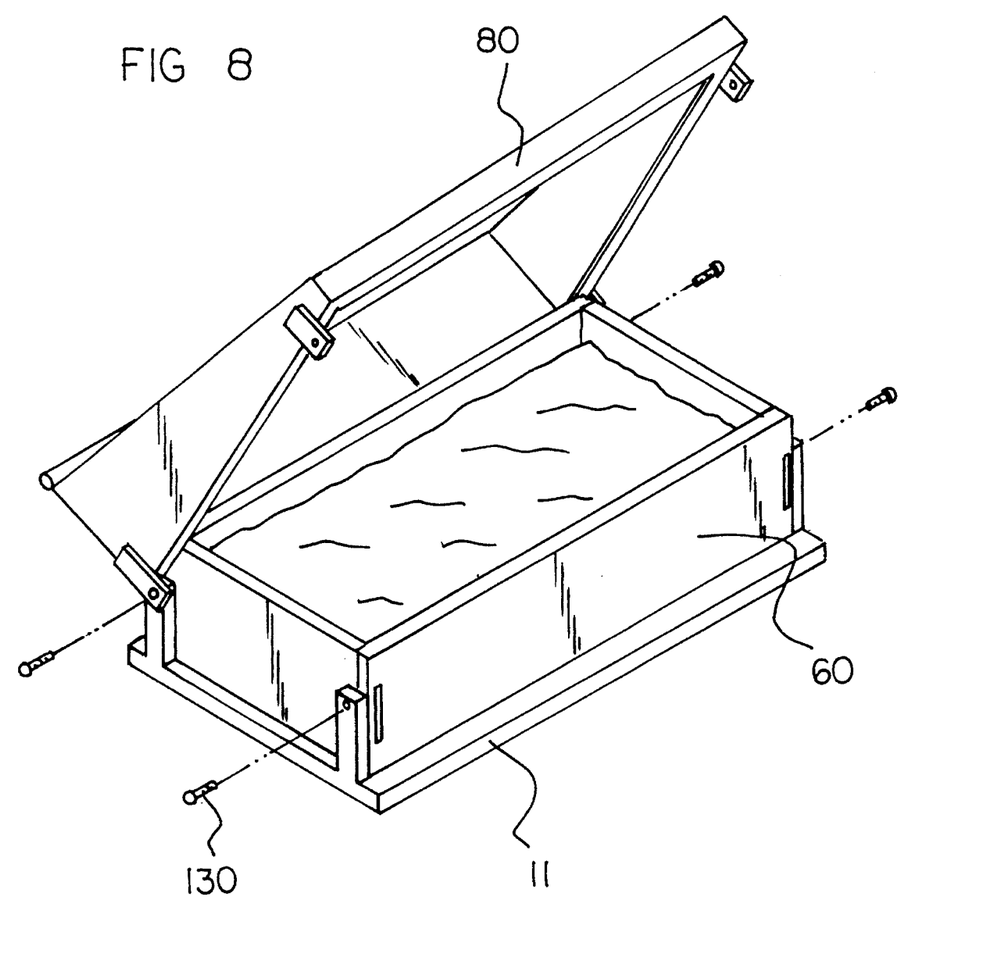
FIG. 8 is a perspective view of an alternate embodiment of the present invention.

A second embodiment of the present invention is shown in FIG. 8. This embodiment is different from the first in that only one set of pins 130 is needed for coupling the tray 11, border 60, and cover together 80. The tabs of the tray and brackets of the cover are of sufficient length such that at each corner of the present invention, a through hole 117 of a bracket, a through hole 20 of the tab, a through hole 57 of a long wall, and a through hole 40 of a short wall are axially aligned.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A disassembleable portable cold frame apparatus for allowing proper maintenance of light, temperature, and humidity within an enclosed space for ready growth of plants comprising, in combination:

a rigid rectangular tray having a planar bottom with an upper integral rectangular ledge extended therearound to define a central recessed area, the ledge formed of a pair of spaced parallel long rails and a pair of spaced parallel short rails extended therebetween, the ledge further having four elongated tabs extended perpendicularly upwards therefrom at a corner thereof and with each tab additionally having a through hole formed thereon;

a pair of planar rigid rectangular short side plates, each short side plate having a periphery formed of an upper long edge, a lower long edge, and a pair of short side edges extended therebetween and with each side edge further having a rectangular tongue projected outwardly therefrom and with each tongue additionally having a through hole formed centrally thereon, each short side plate additionally including a pair of spaced through holes formed thereon at a location near the upper edge thereof;

a pair of planar rigid rectangular long side plates, each long side plate having a periphery formed of an upper long edge, a lower long edge, and a pair of short side edges extended therebetween and with each long side plate further having a pair of rectangular slots formed therethrough with each slot located adjacent to one of the side edges thereof, each side edge of the long side plate additionally having a through hole disposed thereon in communication with the adjacently located slot, the short side plates perpendicularly extended between the long side plates and with each tongue thereof slidably disposed within an adjacent slot to thereby create a rectangular border bounding a ground holding space and with the border positioned upon the central recess of the tray in contact with the rails thereof;

a first set of four rigid pegs with each peg separately disposed within one of the through holes of one of the tabs, within one of the through holes of one of the long side plates of the border, and within the through hole on the tongue of the associated short side plate of the border, the pegs thus placing the border in a secure interconnected configuration;

a rigid transparent cover including a short rectangular front wall having a periphery formed an upper edge, a lower edge, and a pair of opposed side edges, a tall rectangular back wall having a periphery formed of an upper edge, a lower edge, and a pair of opposed side edges, a pair of opposed spaced side walls extended perpendicularly between the front wall and back wall to create a perimeter bounding an air space and with each side wall having a periphery formed of a bottom edge extended perpendicularly between the front wall and back wall, a top edge extended angularly upwards from the front wall to the back wall, a short front edge coupled to a side edge of the front wall, and a long back edge coupled to a separate side edge of the back wall, the cover additionally including a rectangular lid positionable upon the perimeter and over the air space and a hinge coupling the lid to the back wall, each side wall additionally including a pair of spaced brackets coupled thereto and extended downwards therefrom and with each bracket having a through hole formed thereon; and a second set of four rigid pegs with each peg removably disposed within a through hole of one of the brackets of the cover and within a through hole on the side wall of the border near the upper edge thereof and with the second set of pins securing the cover in an aligned position upon the border to thereby place the air space directly above the ground holding space and with two symmetrically opposed pins of the second set removable for allowing the cover to be pivotally opened and closed.

2. A disassembleable portable cold frame apparatus for allowing proper maintenance of light, temperature, and humidity within an enclosed space for ready growth of plants comprising, in combination:

a rigid rectangular tray having a planar bottom with an upper integral rectangular ledge extended therearound to define a central recessed area, the perimeter formed of a pair of spaced parallel long rails and a pair of spaced parallel short rails extended therebetween, the ledge further having four elongated tabs extended perpendicularly upwards therefrom at a corner thereof and with each tab additionally having a through hole formed thereon;

a pair of planar rigid rectangular short side plates, each short side plate having a periphery formed of an upper long edge, a lower long edge, and a pair of short side edges extended therebetween and with each side edge further having a rectangular tongue projected outwardly therefrom and with each tongue additionally having a through hole formed centrally thereon;

a pair of planar rigid rectangular long side plates, each long side plate having a periphery formed of an upper long edge, a lower long edge, and a pair of short side edges extended therebetween and with each long side plate further having a pair of rectangular slots formed thereon with each slot located adjacent to a separate side edge, each side edge of the long side plate additionally having a through hole disposed thereon in communication with the adjacently located slot, the short side plates perpendicularly extended between the long side plates, each tongue slidably disposed within an adjacent slot to thereby create a rectangular border bounding a ground holding space, the border positioned within the central aperture of the tray in alignment within with the rails thereof and with the through holes thereof aligned with the through holes on the long walls;

a rigid transparent cover including a short rectangular front wall having a periphery formed an upper edge, a lower edge, and a pair of opposed side edges, a tall rectangular back wall having a periphery formed of an upper edge, a lower edge, and a pair of opposed side edges, a pair of opposed spaced side walls extended perpendicularly between the front wall and back wall to create a perimeter bounding an air space and with each side wall having a periphery formed of a bottom edge extended perpendicularly between the front wall and back wall, a top edge extended angularly upwards from the front wall to the back wall, a short front edge coupled to a side edge of the front wall, and a long back edge coupled to a separate side edge of the back wall, the cover additionally including a rectangular lid positionable upon the perimeter and over the air space and a hinge coupling the lid to the back wall, each side wall additionally including a pair of spaced brackets coupled thereto and extended downwards therefrom and with each bracket having a through hole formed thereon and with the through holes positionable in alignment with the through holes on the tabs; and a first set of four rigid pegs with each peg removably disposed within one of the through holes of one of the brackets, within one of the through holes of one of the tabs, within one of the through holes of one of the long walls, and within the associated through hole of one of the short walls, the pegs thereby securing the cover in an aligned position upon the border and placing the air space directly above the ground holding space and with two symmetrically opposed pins of the first set removable for allowing the cover to be pivotally opened and closed.

* * * * *